(12) United States Patent
Li

(10) Patent No.: US 7,486,105 B2
(45) Date of Patent: Feb. 3, 2009

(54) MEMORY SYSTEMS AND MEMORY ACCESS METHODS

(75) Inventor: Ching-Chih Li, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 11/625,368

(22) Filed: Jan. 22, 2007

(65) Prior Publication Data

US 2008/0177913 A1    Jul. 24, 2008

(51) Int. Cl.
*H03K 17/16*    (2006.01)
*H03K 19/003*    (2006.01)
(52) U.S. Cl. .............................. 326/30; 326/32; 326/33
(58) Field of Classification Search .................... 326/30
See application file for complete search history.

(56) References Cited

U.S. PATENT DOCUMENTS

| 6,356,106 B1 * | 3/2002 | Greeff et al. .................. 326/30 |
| 6,917,546 B2 * | 7/2005 | Matsui ....................... 365/198 |
| 2003/0161196 A1 * | 8/2003 | Park et al. ................... 365/200 |

* cited by examiner

*Primary Examiner*—Anh Q Tran
(74) *Attorney, Agent, or Firm*—Thomas, Kayden, Horstemeyer & Risley

(57) ABSTRACT

A memory system includes a first memory unit, a transmission bus having an impedance, and a memory controller having a first on-die termination circuit, coupled to the first memory unit through the transmission bus. The first on-die termination circuit matches the impedance of the transmission bus in response to the memory controller writing data to the first memory unit.

26 Claims, 4 Drawing Sheets

US 7,486,105 B2

MEMORY SYSTEMS AND MEMORY ACCESS METHODS

BACKGROUND OF THE INVENTION

1. Field of the Invention

The invention relates to memory systems and memory access methods, and more particularly to memory systems and memory access methods using on-die terminations.

2. Description of the Related Art

Conventional computer systems generally include a processing unit, such as a microprocessor, dynamic memory units, data storage units, and other peripheral units, such as I/O. A circuit board is provided for interconnecting these various functional units. Some of the functional units are installed directly on the circuit board, while others are connected to the circuit board through expansion sockets. For instance, a particular circuit board may have surface-mounted memory modules, memory modules that interact with one or more expansion sockets, or a combination of both.

Commonly used memory modules that interact with expansion sockets through edge connectors are multi-chip modules (MCMs). Generally, MCMs may be designed to include more than one type of die within a single package, or may include multiples of the same die, such as a single inline memory module (SIMM) or a dual in-line memory module (DIMM). MCMs are available in different capacities and speeds to accommodate the needs of the computer system.

The memory, whether installed directly on the circuit board or through expansion sockets, are coupled to a common transmission bus, where data, address, and command signals are provided in parallel to the various modules. The operating environment (e.g., speed, bus load) and physical characteristics (e.g., length) of the transmission bus affect the characteristics of the transmission bus. In addition, electrical signals are reflected back when they reach the end of a transmission path. Electrical signals can also be reflected at points where impedance differs, such as at bus and DRAM connection points.

One technique for reducing the effects of reflections on the transmission bus is to install a termination circuitry connected to the transmission bus on the circuit board. However, a relatively large surface area of the circuit board is required by the termination circuitry, increasing the cost of the circuit board and reducing available area for other resources. In addition, more vias are required for installing the termination circuitry, increasing layout complexity and the delay of signals.

BRIEF SUMMARY OF INVENTION

Memory systems and memory access methods are provided. An exemplary embodiment of a memory system comprises a first memory unit, a transmission bus having an impedance, a memory controller accessing the first memory unit, and a first on-die termination circuit located in the memory controller and coupled to the first memory unit through the transmission bus to match the impedance of the transmission bus. The first on-die termination circuit comprises a termination resistor coupled to the transmission bus, and a switch coupled between the termination resistor and a bias voltage, wherein the switch is turned on to activate the termination resistor in response to the memory controller accessing the first memory unit.

Another exemplary embodiment of a memory system comprises a first memory unit, a transmission bus having an impedance, and a memory controller having a first on-die termination circuit, coupled to the first memory unit through the transmission bus, wherein the first on-die termination circuit matches the impedance of the transmission bus in response to the memory controller writing data to the first memory unit.

An exemplary embodiment of a memory access method comprises obtaining a type of a first memory unit, determining a bias voltage applied to a first on-die termination circuit in a memory controller according to the type of the first memory unit, the memory controller writing data to the first memory unit through a transmission bus having an impedance, wherein the first on-die termination circuit matches the impedance of the transmission bus in response to the memory controller writing data to the first memory unit.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
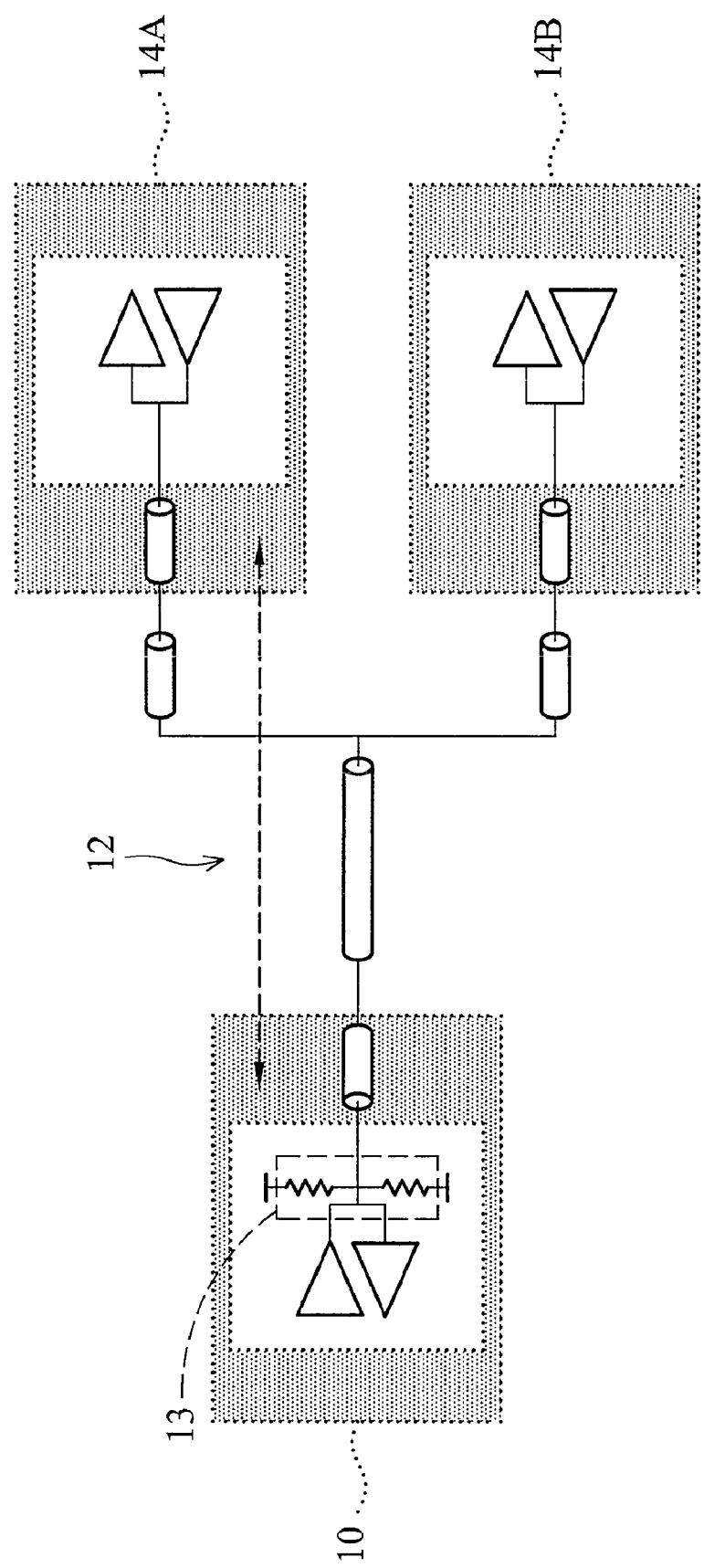
FIG. 1 is a block diagram of a memory system according to an embodiment of the invention.

FIG. 1 is a block diagram of a memory system according to an embodiment of the invention. Memory controller 10 accesses memory unit 14A, which is an active memory unit, using control signals such as DQ, DQS, /DQS, RDQS, and /RDQS through transmission bus 12, while memory unit 14B, not accessed by memory controller 10, is set to standby mode. In an embodiment of the invention, memory units 14A and 14B can be a synchronous dynamic random access memory (SDRAM) or a double-date-rate synchronous dynamic random access memory (DDR SDRAM).

Transmission bus 12 may comprise an address bus and data bus. The address bus is driven by the memory controller 10 to transport information of the specific memory locations identified for both write cycles and read cycles. The data bus transports the information written to active memory unit 14A during a write cycle or read from active memory unit 14A during a read cycle. Note that the data bus is "bi-directional" in that the information written into active memory unit 14A during a write cycle is driven by the memory controller 10; while, by contrast, the information read from active memory unit 14A during a read cycle is driven across the data bus by the memory 204. In addition, transmission bus 12 has path impedance, which may cause transmitted electrical signals reflected.

Figure 2:
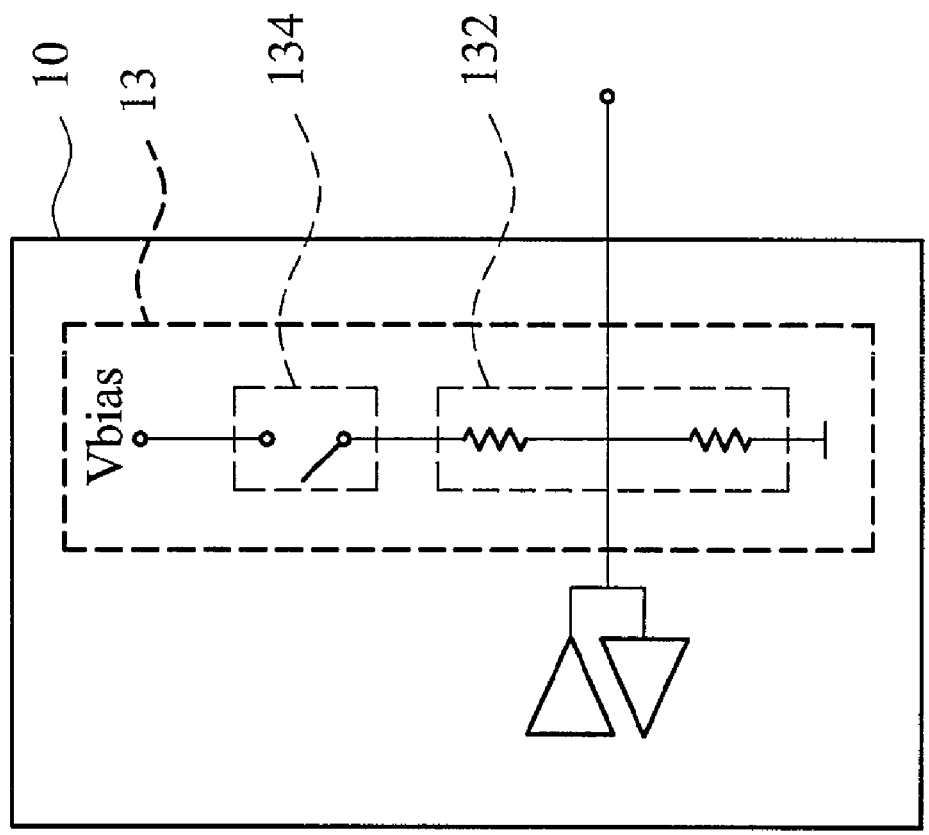
FIG. 2 is a block diagram of a memory controller according to an embodiment of the invention.

FIG. 2 is a block diagram of memory controller 10 according to an embodiment of the invention. Memory controller 10 comprises on-die termination circuit 13 coupled to memory units 14A and 14B through transmission bus 12 to match the path impedance of transmission bus 12 and suppress reflection of signals thereof. In an embodiment of the invention, on-die termination circuit 13 comprises a termination resistor 132 coupled to transmission bus 12 through an I/O pin, and a switch 134 coupled between termination resistor 132 and a bias voltage Vbias. In an embodiment of the invention, bias voltage is determined according to the type of the memory unit assessed by memory controller 10, for example, bias voltage Vbias is set as 3.3V when the accessed memory unit is SDRAM, 2.5V when the accessed memory unit is DDR SDRAM, and 1.8V when the accessed memory unit is DDR2 SDRAM.

Note that on-die termination circuit 13 can be installed in the die of memory controller 10 and on the I/O pins of memory controller 10 requiring impedance matching or signal damping during memory unit access. In some embodiments, the I/O pins may provide control signals DQ, DQS, /DQS, RDQS, and /RDQS. Thus, switch 134 is turned on to activate termination resistor 132 during data writing to and reading from the memory unit.

Referring to FIG. 1, as memory controller 10 accesses memory unit 14A, which is in active mode, address and command signals of memory controller 10 and data are propagated to active memory unit 14A. At the same time, another memory unit 14B, coupled to memory controller 10 through transmission bus 12 but not accessed by memory controller 10, is set in standby mode, thus no signals are input into memory unit 14B. However, reflected signals are still generated when the address and command signals and data are propagated to standby memory unit 14B, but would be absorbed by on-die termination circuit 13.

According to an embodiment of the invention, on-die termination circuit 13 matches path impedance of transmission bus 12 and damps reflection signals generated from other standby memory units. Thus, additional termination resistors or damping resistors installed on circuit board are not required, decreasing the cost of the circuit board and also increasing the area available for other resources. In addition, the number of vias on the circuit board can be decreased, decreasing layout complexity and the delay of signal.

Figure 3:
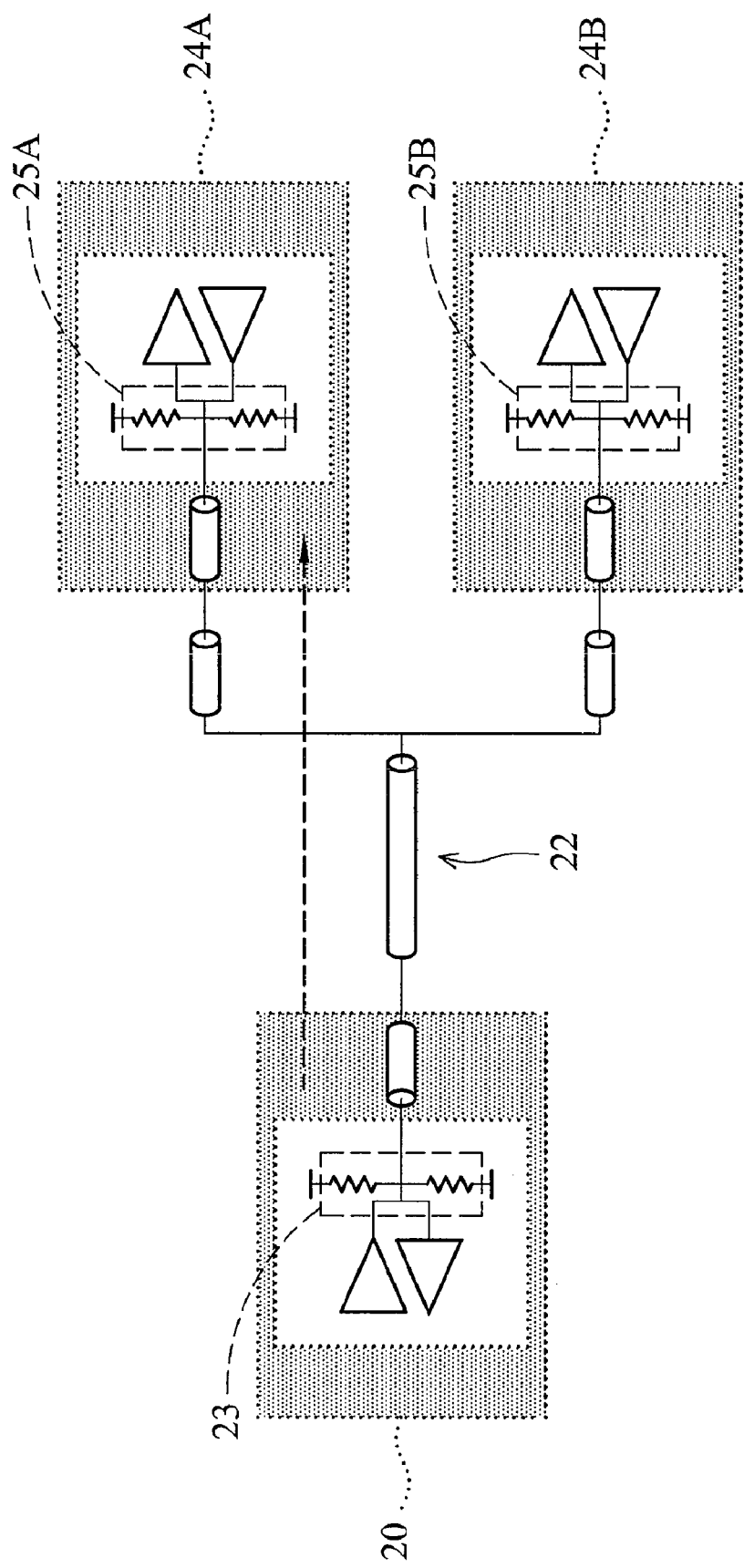
FIG. 3 is a block diagram of a memory system according to another embodiment of the invention.

FIG. 3 is a block diagram of a memory system according to another embodiment of the invention. Memory controller 20 accesses active memory unit 24A using control signals such as DQ, DQS, /DQS, RDQS, and /RDQS through transmission bus 22, while memory unit 24B, not accessed by memory controller 20, is set to standby mode. In an embodiment of the invention, memory units 24A and 24B can be a double-data-rate two synchronous dynamic random access memory (DDR2 SDRAM).

Memory controller 20 and memory units 24A and 24B may each comprise on-die termination circuits 23, 25A and 25B, respectively. In an embodiment of the invention, on-die termination circuits 23, 25A and 25B may have circuit structure similar to the on-die termination circuit 13 shown in FIG. 2, and on-die termination circuits 23 is installed in the die of memory controller 20, while on-die termination circuits 25A and 25B are respectively in the dies of memory units 24A and 24B.

On-die termination circuits 23, 25A and 25B match the path impedance of transmission bus 22 and suppress reflection of signals thereof. On-die termination circuits 23 can be installed on the I/O pins of memory controller 20 requiring impedance matching or signal damping during memory unit access, and on-die termination circuits 25A and 25B can be respectively installed in the memory units 24A and 24B and coupled to corresponding I/O pins of memory controller 20 through transmission bus 22.

As memory controller 20 writes data to memory unit 24A, which is in active mode, address and command signals of memory controller 20 and data are propagated to active memory unit 24A. At the same time, another memory unit 24B, which is coupled to memory controller 20 through transmission bus 22 but not accessed by memory controller 20, is set in standby mode, thus no signals are input into the memory unit 24B. In addition, as memory controller 20 reads data from active memory unit 24A, address and command signals of memory controller 20 are propagated to active memory unit 24A, and data is received by memory controller 20 from active memory unit 24A. As described, address and command signals and data are still reflected by the standby memory unit 24B, and even by memory controller 20, however, the reflected signals are absorbed by on-die termination circuits 23, 24A and 24B.

According to an embodiment of the invention, on-die termination circuits 23, 24A and 24B match path impedance of transmission bus 22 and damp reflection signals generated from other standby memory units and memory controller. Thus, additional termination resistors or damping resistors installed on circuit board are not required, decreasing the cost of the circuit board and also increasing the area available for installing other resources. In addition, vias employed in the circuit board are decreased, decreasing layout complexity and the delay of signal.

Figure 4:
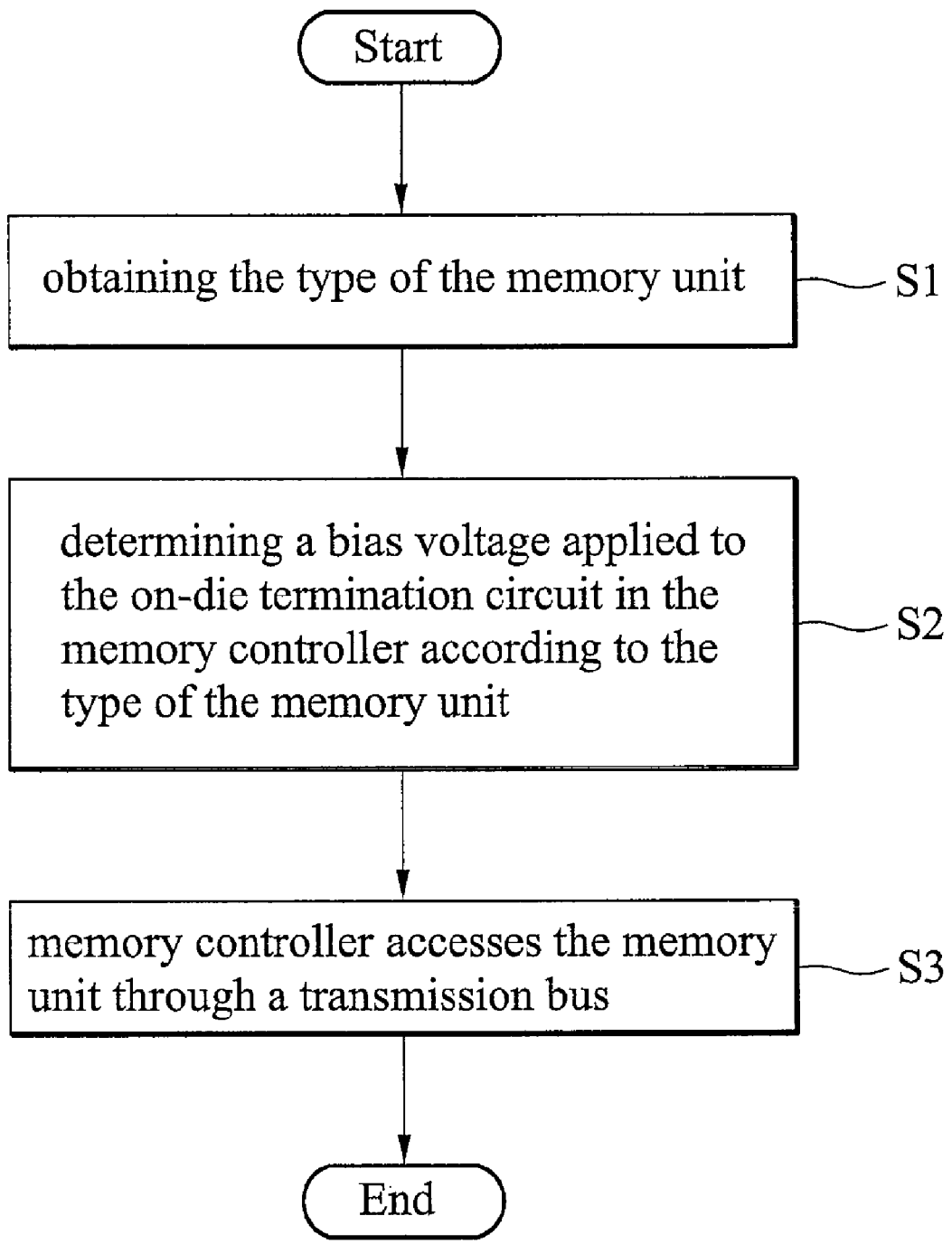
FIG. 4 is a flowchart of a memory access method according to an embodiment of the invention.

FIG. 4 is a flowchart of a memory access method according to an embodiment of the invention. First, the type of the memory unit is obtained (S1). The type of the memory unit can be obtained from the setting of BIOS or by system designer. For example, the type of the memory unit can be SDRAM, DDR SDRAM, or DDR2 SDRAM. Next, a bias voltage applied to the on-die termination circuit in the memory controller is determined according to the obtained type of the memory unit to meet the standard of the specification (S2). For example, the bias voltage is set as 3.3V when the accessed memory unit is a SDRAM, 2.5V when the accessed memory unit is a DDR SDRAM, and 1.8V when the accessed memory unit is a DDR2 SDRAM. Next, memory controller accesses the memory unit through a transmission bus (S3). As memory controller accesses the active memory unit, address and command signals of memory controller 20 is propagated to active memory unit. Even address and command signals or data may reflect by the standby memory unit and the memory controller, however, the reflected signals are absorbed by the on-die termination circuit.

According to an embodiment of the invention, bias voltage of on-die termination circuit is adjusted according to the type of memory unit accessed. In addition, the path impedance of transmission bus is matched by each on-die termination circuit at both sides of the transmission bus. Moreover, reflected signals in the transmission bus are also damped or absorbed by the on-die termination circuits in the dies of memory controller and memory units, the conventional termination resistors or damping resistors installed on circuit board are not required, decreasing the cost of the circuit board and also increasing the area available for installing other resources. In addition, the number of vias on the circuit board can be decreased, decreasing layout complexity and the delay of signal.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A memory system, comprising:
   a first memory unit;
   a transmission bus having an impedance;
   a memory controller having a first on-die termination circuit, coupled to the first memory unit through the transmission bus, wherein the first on-die termination circuit matches the impedance of the transmission bus in response to the memory controller writing data to the first memory unit; and
   a second memory unit coupled to the memory controller through the transmission bus;
   wherein the first memory unit further comprises a third on-die termination circuit damping signals reflected from the second memory unit to the first memory unit in response to the memory controller writing data to the first memory unit.

2. The memory system as claimed in claim 1, wherein the first on-die termination circuit damps signals reflected from the second memory unit in response to the memory controller accessing the first memory unit.

3. The memory system as claimed in claim 1, wherein the first on-die termination circuit damps signals reflected to the first memory unit in response to the memory controller accessing the first memory unit.

4. The memory system as claimed in claim 1, wherein the first on-die termination circuit comprises:
   a termination resistor coupled to the transmission bus; and
   a switch coupled between the termination resistor and a bias voltage, wherein the switch is turned on in response to the memory controller accessing the first memory unit to activate the termination resistor, and the bias voltage is determined according to the type of the first memory unit.

5. The memory system as claimed in claim 1, wherein the first memory unit is a dynamic random access memory.

6. The memory system as claimed in claim 1, wherein the first memory unit is a synchronous dynamic random access memory.

7. The memory system as claimed in claim 1, wherein the first memory unit is a double-date-rate synchronous dynamic random access memory or a double-data-rate two synchronous dynamic random access memory.

8. A memory system, comprising:
   a first memory unit;
   a transmission bus having an impedance;
   a memory controller having a first on-die termination circuit, coupled to the first memory unit through the transmission bus, wherein the first on-die termination circuit matches the impedance of the transmission bus in response to the memory controller writing data to the first memory unit; and
   a second memory unit coupled to the memory controller through the transmission bus, having a second on-die termination circuit damping signals reflected from the second memory unit to the first memory unit in response to the memory controller writing data to the first memory unit.

9. The memory system as claimed in claim 8, wherein the first on-die termination circuit damps signals reflected from the second memory unit in response to the memory controller writing data to the first memory unit.

10. The memory system as claimed in claim 8, wherein the first on-die termination circuit damps signals reflected to the first memory unit in response to the memory controller reading data from the first memory unit.

11. The memory system as claimed in claim 8, wherein the first memory unit further comprises a third on-die termination circuit damping signals reflected from the second memory unit to the first memory unit in response to the memory controller writing data to the first memory unit.

12. The memory system as claimed in claim 8, wherein the first on-die termination circuit comprises:
    a termination resistor coupled to the transmission bus; and
    a switch coupled between the termination resistor and a bias voltage, wherein the switch is turned on in response to the memory controller accessing the first memory unit to activate the termination resistor.

13. The memory system as claimed in claim 12, wherein the bias voltage is determined according to the type of the first memory unit.

14. The memory system as claimed in claim 8, wherein the first memory unit is a dynamic random access memory.

15. The memory system as claimed in claim 8, wherein the first memory unit is a synchronous dynamic random access memory.

16. The memory system as claimed in claim 8, wherein the first memory unit is a double-date-rate synchronous dynamic random access memory.

17. The memory system as claimed in claim 8, wherein the first memory unit is a double-data-rate two synchronous dynamic random access memory.

18. A memory access method, comprising:
    obtaining a type of a first memory unit;
    determining a bias voltage applied to a first on-die termination circuit in a memory controller according to the type of the first memory unit;
    the memory controller writing data to the first memory unit through a transmission bus having an impedance, wherein the first on-die termination circuit matches the impedance of the transmission bus in response to the memory controller writing data to the first memory unit; and
    coupling a second memory unit to the memory controller through the transmission bus, wherein the second memory unit further comprises a second on-die termination circuit damping signals reflected from the second memory unit to the first memory unit in response to the memory controller writing data to the first memory unit.

19. The memory access method as claimed in claim 18, wherein the first on-die termination circuit damps signals reflected from the second memory unit in response to the memory controller writing data to the first memory unit.

20. The memory access method as claimed in claim 18, wherein the first on-die termination circuit damps signals reflected to the first memory unit in response to the memory controller reading data from the first memory unit.

21. A memory access method, comprising:
    obtaining a type of a first memory unit:
    determining a bias voltage applied to a first on-die termination circuit in a memory controller according to the type of the first memory unit;
    the memory controller writing data to the first memory unit through a transmission bus having an impedance, wherein the first on-die termination circuit matches the impedance of the transmission bus in response to the memory controller writing data to the first memory unit; and coupling a second memory unit to the memory controller through the transmission bus;
    wherein the first memory unit further comprises a third on-die termination circuit damping signals reflected from the second memory unit to the first memory unit in response to the memory controller writing data to the first memory unit.

22. The memory access method as claimed in claim 18, wherein the first on-die termination circuit comprises:
   a termination resistor coupled to the transmission bus; and
   a switch coupled between the termination resistor and the bias voltage, wherein the switch is turned on to activate the termination resistor in response to the memory controller accessing the first memory unit.

23. The memory access method as claimed in claim 18, wherein the first memory unit is a dynamic random access memory.

24. The memory access method as claimed in claim 18, wherein the first memory unit is a synchronous dynamic random access memory.

25. The memory access method as claimed in claim 18, wherein the first memory unit is a double-date-rate synchronous dynamic random access memory.

26. The memory access method as claimed in claim 18, wherein the first memory unit is a double-data-rate two synchronous dynamic random access memory.

* * * * *